Nov. 24, 1925.
A. Y. DODGE
1,562,823
BRAKE CONSTRUCTION
Filed March 29, 1924
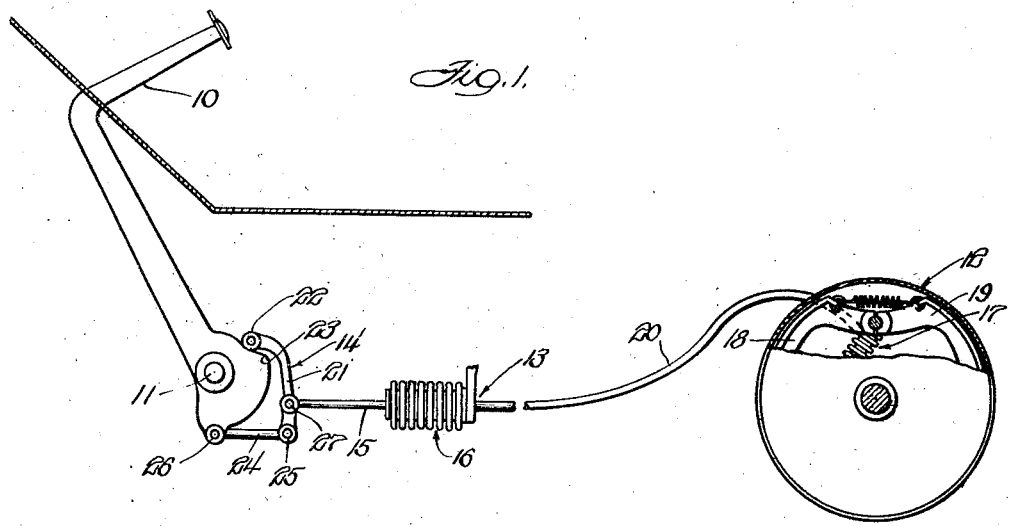
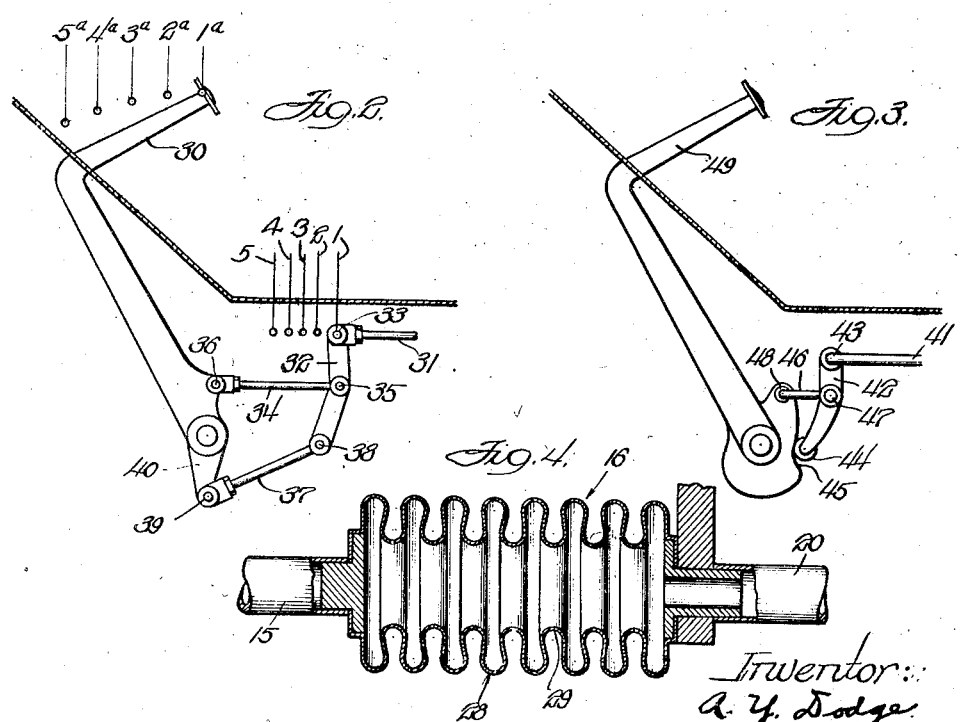
Inventor:
A. Y. Dodge
By Jones, Addington, Ames & Seibold
Attys.

Patented Nov. 24, 1925.

1,562,823

UNITED STATES PATENT OFFICE.

ADIEL Y. DODGE, OF SOUTH BEND, INDIANA, ASSIGNOR, BY MESNE ASSIGNMENTS, TO BENDIX BRAKE COMPANY, OF CHICAGO, ILLINOIS, A CORPORATION OF ILLINOIS.

BRAKE CONSTRUCTION.

Application filed March 29, 1924. Serial No. 702,768.

*To all whom it may concern:*

Be it known that I, ADIEL Y. DODGE, a citizen of the United States, residing at South Bend, in the county of St. Joseph and State of Indiana, have invented new and useful Improvements in Brake Construction, of which the following is a full, clear, concise, and exact description, reference being had to the accompanying drawing, forming a part of this specification.

My invention relates to automobile brake construction.

One of the objects of my invention is to provide an automobile brake construction in which the movement ratio of the reach rod with respect to the pedal decreases as the pedal movement progresses. Such a construction is desirable in order that a short initial movement of the brake pedal will take up most of the slack in the brake mechanism and enable the succeeding movement of the pedal to cause a slower, more powerful action of the brake. This construction is designed to be used in place of the expensive and intricate "Servo" devices now in use in foreign automobile practice. It has been found in practice that 5 or 6 inches of pedal movement is all that is desirable in passenger automobiles. With heavy cars and cars equipped with four wheel brakes it is desirable to use as much as possible of this pedal travel for useful work. All brakes must have clearance and all brake mechanism will have some "play" and "give". It is an object of my invention to take up practically all of this slack with a minimum of pedal movement. It is a further object of my invention to provide a device which will take up the slack with a minimum of pedal movement, and thereafter applying a powerful substantially uniform effort on the brake rod through the balance of the pedal movement.

Further objects will appear from the description and claims.

In the drawings in which an embodiment of my invention is shown—

Figure 1 is a diagrammatic side elevational view showing the brake pedal, the brake and the transmission from the pedal to the brake;

Fig. 2 is a side elevational view showing a different form of connection between the pedal and reach rod;

Fig. 3 is a side elevational view showing still another form of connection; and

Fig. 4 is an enlarged sectional view showing one of the actuating devices used in the imperforate fluid pressure transmission system.

The mechanism for controlling the movement ratio of the reach rod with respect to the pedal in all of the forms shown is carried by the pedal itself and acts between the pedal and a reach rod forming part of the transmission to the brake.

Referring first to the construction shown in Fig. 1, this comprises a brake pedal 10, pivotally mounted at 11, a brake 12, an imperforate hydraulic transmission 13, and a movement ratio controlling device 14, between the pedal 10, and the reach rod 15, connected with the hydraulic actuator 16.

The imperforate hydraulic system shown comprises the compressible and expandible actuator 16 (Figs. 1 and 4), and expansible and compressible actuator 17, similar to the actuator 16, for acting on the brake shoes 18 and 19, and a tube 20, affording communication between the actuator 16 and the actuator 17.

The movement ratio controlling device 14 in Fig. 1 comprises a lever 21 having a follower portion 22, a cam portion 23 formed on the pedal 10, and a link 24 pivotally connected at 25 with the lever 21 and pivotally connected at 26 with the foot pedal. The cam lever 21 is pivotally connected at 27 with the reach rod 15 which acts on the hydraulic actuator 16. A study of the movement ratio controlling device will show that the initial pedal movement will cause a relatively great movement of the reach rod 15 due to the abrupt rise in the cam portion 23, while the succeeding movement of the pedal will cause a much slower movement of the reach rod, as the succeeding portion of the cam 23 is substantially concentric with the pivotal point 11 of the pedal so that this succeeding movement of the reach rod is due only to the action of the link 24 on the lever 21.

By suitable design of the cam portion 23 any desired movement ratio of the reach rod 15 with respect to the pedal 10 may be secured.

The reach rod 15 will travel in a straight line due to its connection with the actuator 16.

Fig. 4 shows, in detail, one construction of the hydraulic actuator. As here shown, it comprises an integral corrugated metal chamber or cell 28, having a plurality of deep annular corrugations 29 which enable the cell to be readily expanded and compressed to vary its capacity to cause the flow of the fluid in one direction or the other through the tube 20. As the system is imperforate, having no moving parts extending through openings from the inside to the outside of the system, there is no chance for leakage.

Fig. 2 shows a construction which may be used with the ordinary mechanical transmission if desired. In this form the movement ratio controlling construction between the pedal 30 and the reach rod 31 comprises a lever 32, pivotally connected at 33, with the reach rod, a link 34, pivotally connected at 35 with the lever 32 and pivotally connected at 36 with the pedal 30, and a second link 37, pivotally connected at 38 with the lever 32 and pivotally connected at 39 with the extension 40 of the pedal. In this construction also, a plot of the movement of the pedal and the parts of the movement ratio of the reach rod 31 with respect to the pedal 30 decreases as the pedal movement progresses. In this construction the link 34 will remain substantially horizontal in its movement, due to the direction of the forces acting on it. If desired additional means may be provided to insure that it does remain substantially horizontal.

The points indicated at 1, 2, 3, 4 and 5 show the different positions which the pivotal point 33 of the reach rod will occupy corresponding to the points 1ª, 2ª, 3ª, 4ª, and 5ª of the pedal movement. It will be seen that the movement ratio of the reach rod with respect to the pedal decreases materially as the pedal movement progresses.

Fig. 3 shows still another form of movement ratio controlling construction which may be used with the ordinary mechanical brake transmission if desired. This form is similar to the construction shown in Fig. 1, except that the reach rod 41, in Fig. 3 is moved in the opposite direction to that of Fig. 1. In this form, the movement ratio controlling construction comprises a lever 42, pivotally connected at 43 with the reach rod 41, and having a cam follower or roller 44, engaging the cam portion 45 of the pedal, and a link 46 pivotally connected at 47 with the lever 42, and pivotally connected at 48 with the pedal 49. In this form, the initial movement of the pedal 49 will cause a relatively great movement of the reach rod 41 due to the abrupt rise of the cam portion 45, and the succeeding movement of the reach rod will be comparatively slow and powerful, as the succeeding cam portion may be concentric with the axis of the pedal 49 so that this succeeding movement of the reach rod is due only to the action of the link 46. In the construction shown in Fig. 3, the reach rod 41 will move substantially in a straight line due to the direction of the forces acting on it. If necessary additional means may be provided for causing it to move substantially in a straight line.

By movement ratio of the reach rod to the pedal, I mean the rate of movement of the reach rod as compared to the rate of movement of the pedal.

The construction shown in Figs. 1 and 3, where a cam is used, gives a relatively high constant movement ratio for the first third of the pedal travel, then an abrupt change to a considerable lower ratio, which lower ratio remains substantially constant for the remaining two-thirds of the pedal travel.

In Fig. 2, where a link construction is used, the movement ratio varies continually with no abrupt change, but decreases as the pedal movement progresses, so that the reach rod moves quickly at first, and slowly and powerfully in the latter part of its movement.

Having thus described my invention, what I claim as new and desire to secure by Letters Patent of the United States is:

1. A brake construction comprising a pedal, a longitudinal reciprocable reach rod for causing actuation of the brake mechanism and transmission means between said pedal and reach rod comprising means whereby the movement ratio of the reach rod to the pedal decreases substantially as the pedal movement progresses, said last means comprising a lever pivoted to said reach rod and a pair of connections between the pedal and lever.

2. A brake construction comprising a pedal, a longitudinal reciprocable reach rod for causing actuation of the brake mechanism and transmission means between said pedal and reach rod comprising means whereby the movement ratio of the reach rod to the pedal decreases substantially as the pedal movement progresses, said last means comprising a lever pivoted to said reach rod and a link pivotally connected at one end to said lever and at the other end to said pedal, said pedal having a cam portion acting on said lever.

3. A brake construction comprising a pedal, a longitudinal reciprocable reach rod for causing actuation of the brake mechanism and transmission means between said pedal and reach rod comprising means whereby the movement ratio of the reach rod to the pedal decreases substantially as the pedal movement progresses, said means comprising an arm mounted to swing toward and away from said pedal and pivotally connected to said reach rod.

4. Brake-operating mechanism comprising, in combination, a pedal, a brake applying connection, a lever rocked by depression of the pedal and operating the brake applying connection, and lever-engaging means moved by depression of the pedal for shifting the fulcrum of the lever.

5. Brake-operating mechanism comprising, in combination, a pedal, a brake applying connection, a lever rocked by depression of the pedal and operating the brake applying connection, and lever-engaging means moved by depression of the pedal for shifting the fulcrum of the lever to vary the effective lever arm as the pedal is depressed to secure greater power near the end of the stroke of the pedal.

6. Brake-operating mechanism comprising, in combination, a brake-operating member, a pedal, a lever operating the brake-operating member, and two connections from the pedal to said lever, one constituting a shiftable fulcrum and the other rocking the lever about the fulcrum, the fulcrum being shifted automatically by its connection when the pedal is depressed to increase the leverage near the end of the stroke of the pedal.

7. Brake-operating mechanism comprising, in combination, a brake-operating member, a pedal, a lever operating the brake-operating member, and two connections from the pedal to said lever, one constituting a shiftable fulcrum and the other being a link arranged to rock the lever about the fulcrum, the fulcrum being shifted automatically by its connection when the pedal is depressed to increase the leverage near the end of the stroke of the pedal.

In witness whereof, I have hereunto subscribed my name.

ADIEL Y. DODGE.